United States Patent Office 3,483,359
Patented Dec. 9, 1969

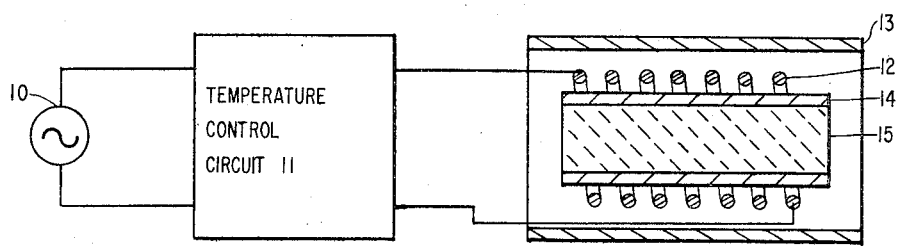
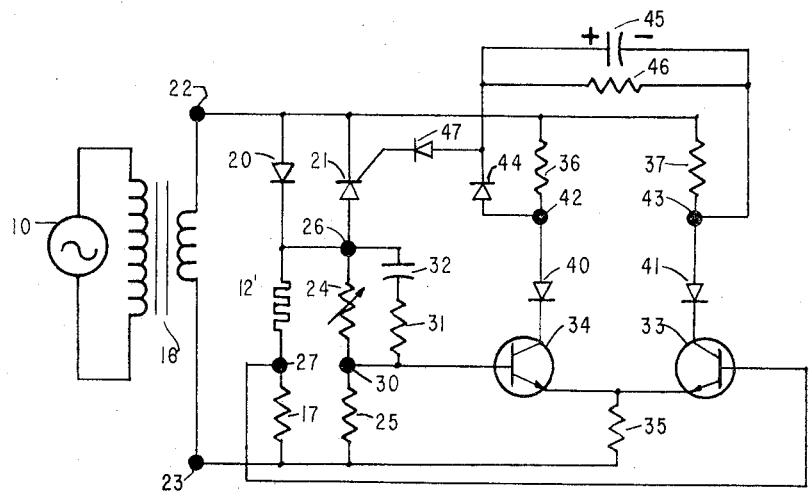
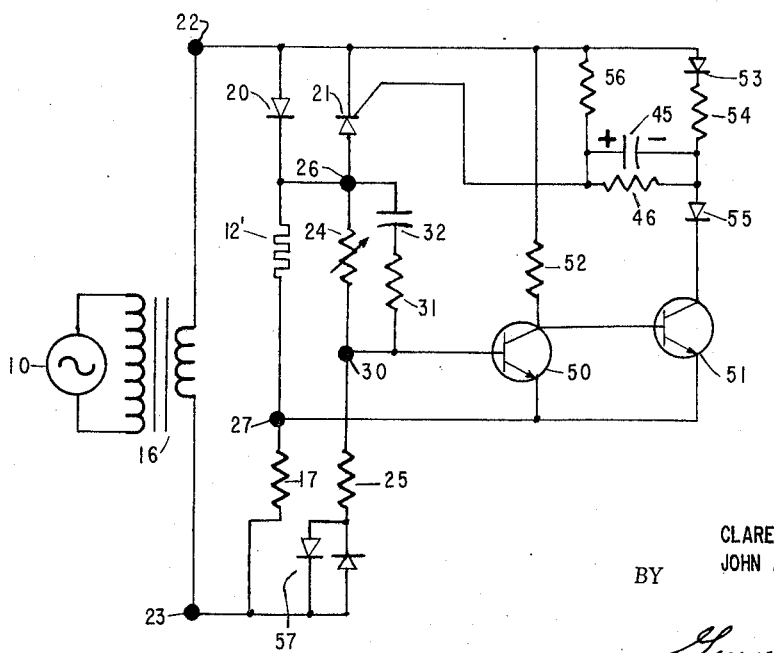

3,483,359
TEMPERATURE CONTROL CIRCUIT
Clarence W. Hewlett, Jr., Hampton, N.H., and John A. Roberts, Lynnfield Center, Mass., assignors to General Electric Company, a corporation of New York
Filed Dec. 29, 1967, Ser. No. 694,604
Int. Cl. H05b 1/02
U.S. Cl. 219—497                                   8 Claims

ABSTRACT OF THE DISCLOSURE

A system for maintaining an electrically heated device at a constant temperature. Alternating current energizes a heater through a back-to-back diode and silicon controlled rectifier. The heater and another series resistor constitute two legs of a bridge circuit. Bridge unbalance is amplified during one half cycle to charge a capacitive memory circuit and fire the SCR during a succeeding half cycle of opposite polarity to increase the heater current.

BACKGROUND OF THE INVENTION

This application relates to control circuits and more specifically to a control circuit for maintaining the temperature of an electrically heated device.

In certain applications it may be desirable or necessary to maintain an electrically heated device at a constant temperature as the temperature may control certain characteristics. For example, an electric lamp produces light output which is dependent upon the filament temperature. Also the color of light emitted from certain filaments depends upon the filament operating temperature. Such devices used as standards would require exact control of the filament temperature.

Temperature is an important factor in certain gas detectors such as halogen gas detectors, combustible gas detectors and solid oxygen-ion electrolyte oxygen sensors. Each of these devices requires a heating element to elevate its operating temperature into the range of 600° C. to 1200° C. While the devices are operative over the entire range, their sensitivities or other characteristics are dependent upon the particular operating temperature. Hence, it is necessary to control the temperature if the device is to be operated in a high sensitivity range or with good repeatability.

Therefore, it is an object of this invention to provide a circuit adapted for controlling the temperature of an electrically heated device.

Another object of this invention is to provide a temperature control circuit for maintaining a heated device at a constant, critical temperature.

SUMMARY

In accordance with one aspect of this invention, current pulses of one polarity are conducted to an electric heater. During conduction the heater temperature is measured by comparing its resistance to a standard resistance. Variations of the resistance in one direction cause conduction of a succeeding pulse of the opposite polarity through the heater element to increase the heater current.

This invention is pointed out with particularity in the appended claims. A more thorough understanding of the above and further objects and advantages of this invention may be obtained by referring to the following detailed description taken in conjunction with the drawings.

BRIEF DESCRIPTION OF THE DRAWINGS

FIGURE 1 is a partially pictorial and partially schematic diagram showing a device for which a temperature control circuit formed in accordance with this invention is adapted;

FIGURE 2 is a schematic of one embodiment of a temperature control circuit formed in accordance with this invention; and FIGURE 3 is a schematic of another embodiment of a temperature control circuit formed in accordance with this invention.

DESCRIPTION OF ILLUSTRATIVE EMBODIMENTS

FIGURE 1 illustrates one application for a temperature control circuit formed in accordance with this invention. An alternating current source 10 is coupled to a temperature control circuit 11 to controllably energize a heater coil 12. For illustration, the heater coil 12 is disposed within a housing 13 to heat an electrode 14 wrapped about an insulating core 15. Examples of devices utilizing constructions or concepts such as in FIGURE 1 are halogen and combustible gas leak detectors and in solid oxygen-ion electrolyte oxygen sensors and generators. In these particular applications, the temperature of the heater coil 12, the electrode 14 and the insulating core 15 are accurately related. A lamp filament may be substituted for the heater coil. Such a filament would be electrically connected to the output of the temperature control circuit 11.

In FIGURE 2, a temperature control circuit couples an alternating current source 10 to a heater coil 12', analogous to the heater coil 12 in FIGURE 1. Specifically, the heater coil 12' is coupled to the alternating current source 10 through a transformer 16, a resistor 17, a diode 20 and a silicon controlled rectifier (SCR) 21. When a terminal 22, connected to one side of the transformer 16, is positive with respect to a terminal 23, the diode 20 is forward biased and the heater coil 12' is energized. When the terminal 22 is negative, the heater coil 12' is energized only if the SCR 21 is turned on.

Functionally, the A-C source 10 and the transformer 16 constitute a pulsating, reversible polarity current source. The diode 20 and the SCR 21 constitute a current control means for coupling current pulses of one polarity and selectively coupling current pulses of the opposite polarity to the heater coil 12'.

The remaining circuitry shown in FIGURE 2 compares the temperature of the heater coil 12' with a predetermined temperature value to produce a control signal which is coupled to the SCR 21. A resistor, specifically shown as a variable resistor 24 and another resistor 25 in series therewith are paralleled with heater coil 12' and the resistor 17 to constitute a bridge circuit in which the resistance of the heater coil 12' is the variable input. The bridge circuit, energized at terminals 26 and 23, is set by adjusting the variable resistor 24 to balance the bridge when the heater coil 12' is at the predetermined temperature. Temperature deviation causes a resistance variation to generate a control signal in response to the element temperature at the bridge output terminals 27 and 30. If the temperature resistance coefficient is positive and the heater coil 12' cools, the voltage at the bridge output terminal 27 will be positive with respect to the bridge output terminal 30.

No lower limit on the value of the temperature resistance coefficient seems to exist although the limit of .05%/° C. is a practical limit in the particular application shown in FIGURES 1 and 2. Most pure metal filaments and many alloys meet this requirement. Smaller coefficients are acceptable where greater temperature tolerances are permissible. With a pure platinum heater coil, experimental results indicate that the temperature may be maintained within less than 1% at 1000° C.

A series resistor 31 and a capacitor 32 are disposed about the resistor 24. These two elements shunt the resistor 24 to compensate for thermal potentials which apparently exist on the heater coil 12' as a result of partial D-C heating.

Control signals at the bridge output terminals 27 and 30 are coupled to a differential amplifier. Specifically, the bridge output terminal 27 is connected to a base electrode of an NPN transistor 33; and the bridge output terminal 30, to the base electrode of an NPN transistor 34. In accordance with conventional transistor amplifier techniques, the emitters of the transistors 33 and 34 are tied together and coupled to the terminal 23 through an emitter resistor 35. The individual collector electrodes are coupled to the terminal 22 by means of resistors 36 and 37 and diodes 40 and 41. Resistors 36 and 37 are difference amplifier load resistors while the diodes 40 and 41 block current and isolate the remaining circuitry during half cycles when the terminal 22 is negative. An amplified control signal may appear at terminals 42 and 43 during half cycles when the terminal 22 is positive to be coupled through a diode 44 to charge a parallel circuit constituted by the capacitor 45 and a bleeder resistor 46 if terminal 42 is positive. The junction of the diode 44, the capacitor 45 and the bleeder resistor 46 is coupled ot the gate electrode of the SCR 21 by another diode 47. By properly selecting component values, the capacitor 45 will retain a sufficient charge to turn on the SCR 21 during a succeeding half cycle when the terminal 22 is negative. Proper selection of the bleeder resistor 46 bleeds the capacitor 45 to prevent any residual charge on the capacitor 45 after one triggering pulse from triggering the SCR 21 on a subsequent half cycle when the terminal 22 is negative.

For example, to maintain a pure platinum heater coil at about 1000° C. within 1% where the heater coil has a resistance of two ohms and a ten volt A-C voltage appears at the terminals 22 and 23, the following components may be used:

| | |
|---|---|
| Diode 20 | 1N1341A |
| SCR 21 | C106Y1 |
| Diodes 40, 41, 44, 47 | 1N645 |
| Transistors 33, 34 | 2N3391 |
| Capacitor 32 mfd | 0.68 |
| Capacitor 45 mfd | 1 |
| Resistor 17 ohms | 0.5 |
| Resistor 24 do | 200 |
| Resistor 25 do | 47 |
| Resistor 31 do | 10,000 |
| Resistor 35 do | 470 |
| Resistor 36, 37 do | 2200 |
| Resistor 46 do | 100,000 |

In the circuit of FIGURE 3 a modification of the amplifier and associate circuitry shown in FIGURE 2 is presented so like numerals denote like elements throughout. As was true in the circuit of FIGURE 2, an A-C source 10 energizes a heater coil 12' by means of a transformer 16, a resistor 17, a diode 20 and an SCR 21. Resistors 24 and 25 complete a bridge circuit so that an output voltage appears between the bridge output terminals 27 and 30 when the bridge is unbalanced. A resistor 31 and a capacitor 32 in parallel with the resistor 24 serve the same function as in the embodiment of FIGURE 2.

In this embodiment, a cascaded transistorized amplifier, constituted by two NPN transistors 50 and 51, is substituted for the difference amplifier. The emitters of the two transistors are connected to the bridge output terminal 27. The base of the transistor 50 is directly connected to the bridge output terminal 30. Its collector is coupled to the terminal 22 by means of a bias resistor and to the base electrode of the transistor 51. The collector of the transistor 51 is coupled to the terminal 22 by means of a diode 53, a resistor 54 and a diode 55 in series. The capacitor 45 and the bleeder resistor 46 are connected between the junction of the resistor 54 and the diode 55 and are also connected to the terminal 22 by means of a resistor 56. The common junction of the capacitor 45 and the resistors 46 and 56 is then directly connected to the gate of the SCR 21. A back-to-back diode network 57 in a series with the resistor 25 compensates for the base-emitter drops in the transistors 50 and 51.

In operation, a decrease of the heater coil resistance causes the bridge output terminal 27 to become positive to thereby turn the transistor 50 off. Hence, the collector voltage goes positive and turns the transistor 51 on. As this occurs only during current pulses when the terminal 22 is positive, current flows through the resistors 54 and 56 to charge the capacitor 46 with a positive charge as shown. The capacitor 46 retains this charge until the next succeeding half cycle or current pulse when the terminal 22 is negative to turn on the SCR 21 thereby increasing the average heater current.

Many modifications may be made to the circuitry revealed in the illustrative embodiments. This circuitry is particularly well adapted, however, to applications where the predetermined temperature or desired operating temperature is in the order of a 1000° C. For other applications where temperatures were not as elevated other comparative circuits could be used to obtain a control signal which varies in response to the element temperature. Similarly, other current sources, amplifying circuits and memory circuits could be used to respond to temperature variations to vary the average heater current.

In accordance with this invention, as illustrated in both embodiments, the heater coil temperature is controlled by sensing its resistance, comparing the resistance to a standard and deciding if the average heater current must be increased during an electrical pulse of one polarity. If a heater current increase is necessary, a decision is made during that same pulse to cause a succeeding pulse of opposite polarity to be conducted through the heater. In view of the many modifications which are applicable to the specific embodiments shown, it is the object of the appended claims to cover all such variations which come within the true spirit and scope of this invention.

What is claimed as new and desired to be secured by Letters Patent of the United States is:

1. A system for maintaining an electrical heater at a predetermined temperature comprising:
   (a) a pulsating, reversible polarity current source,
   (b) current control means coupling current pulses of one polarity and selectively coupling current pulses of the opposite polarity to said heater,
   (c) a comparator circuit including said heater for comparing the heater temperature with the predetermined temperature and connecting said heater to said current source, said comparator circuit generating a control signal in response to the element temperature, and
   (d) means coupling said comparator and current control circuits responsive, during a current pulse of one polarity, to a heater temperature decrease to cause said current control means to couple a succeeding pulse of the opposite polarity to said heater.

2. In a system as recited in claim 1, said current source energizing said system with alternating current, and said current control means being constituted by a diode and a silicon controlled rectifier connected in a back-to-back relationship in series between said source and said heater.

3. In a system as recited in claim 1, said comparator circuit including a bridge circuit including said heater as one leg thereof and a first impedance in series therewith connected between said current control means and said current source, said bridge circuit being balanced when said heater temperature is at the predetermined temperature.

4. In a system as recited in claim 3, said impedance bridge circuit producing a control signal during current pulses of the one polarity, said coupling means including an amplifier circuit and a memory circuit, said amplifier circuit being connected to said bridge circuit for energization by the control signal, said amplifier output being connected to said memory circuit to be retained thereby until initiation of a succeeding pulse of the opposite polarity.

5. In a system as recited in claim 3, said impedance bridge additionally including second and third impedance means serially connected and in parallel with said heater and said first impedance means, said second impedance means being connected to said heater and being adjustable to select the predetermined temperature.

6. In a system as recited in claim 5, said memory circuit being constituted by a capacitive impedance network, said silicon controlled rectifier having a gate electrode connected to said capacitive impedance network, said capacitive impedance network being charged when said heater temperature decreases below the predetermined temperature during the current pulse of the one polarity to provide a triggering pulse during the next succeeding current pulse of the opposite polarity.

7. In a system as recited in claim 6, said amplifier means being constituted by a differential amplifier having input terminals connected to said impedance bridge to be energized by the control signal, said capacitive impedance means being connected between output terminals on said differential amplifier.

8. In a system as recited in claim 6, said amplifier being constituted by a cascaded transistor amplifier, said transistors having emitters connected to one junction of said impedance bridge and one of said transistors having its base connected to another junction of said bridge circuit, said capacitive impedance means being connected in the collector circuit of said cascaded amplifier.

References Cited

UNITED STATES PATENTS

| | | | |
|---|---|---|---|
| 3,215,818 | 11/1965 | Deaton | 219—499 |
| 3,308,271 | 3/1967 | Hilbiber | 219—499 |

FOREIGN PATENTS

| | | |
|---|---|---|
| 892,825 | 3/1967 | Great Britain. |

BERNARD A. GILHEANY, Primary Examiner

F. E. BELL, Assistant Examiner

U.S. Cl. X.R.

219—499